(12) United States Patent
Barnick et al.

(10) Patent No.: US 6,751,005 B1
(45) Date of Patent: Jun. 15, 2004

(54) COMPENSATING FOR PIXEL DEFECTS BY SPATIAL TRANSLATION OF SCENE CONTENT

(75) Inventors: William M. Barnick, Fairport, NY (US); Bryan D. Bernardi, Webster, NY (US); William G. Miller, Williamson, NY (US); James C. Erwin, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/327,412

(22) Filed: Dec. 20, 2002

(51) Int. Cl.[7] .................. G02B 26/00; G03B 27/72; B41B 1/00
(52) U.S. Cl. .................. 359/290; 359/292; 355/35; 358/1.9
(58) Field of Search .................. 359/290, 292; 430/5, 22, 30, 311; 358/1.9; 355/67–71, 35

(56) References Cited

U.S. PATENT DOCUMENTS

| | | | |
|---|---|---|---|
| 5,325,137 A | 6/1994 | Konno et al. ............... 353/63 |
| 5,461,411 A | 10/1995 | Florence et al. ........... 347/240 |
| 5,521,748 A | 5/1996 | Sarraf ........................ 359/321 |
| 5,652,661 A | 7/1997 | Gallipeau et al. .......... 358/302 |
| 5,701,185 A | 12/1997 | Reiss et al. ................ 358/471 |
| 5,743,610 A | 4/1998 | Yajima et al. ............... 353/31 |
| 5,745,156 A | 4/1998 | Federico et al. ........... 347/251 |
| 5,808,800 A | 9/1998 | Handschy et al. ......... 359/630 |
| 5,877,844 A * | 3/1999 | Matsumoto ................. 355/35 |
| 6,618,185 B2 * | 9/2003 | Sandstrom ................. 359/292 |

\* cited by examiner

*Primary Examiner*—Georgia Epps
*Assistant Examiner*—William Choi
(74) *Attorney, Agent, or Firm*—Nelson Adrian Blish (57) ABSTRACT

An improved method is provided for compensating for pixel site defects of a spatial light modulator (30) in an imaging apparatus (10). An image is formed at a first position and directed to a surface (36). Then, an actuator (40) shifts the spatial light modulator (30) over a shift distance to a second position, which is some integer multiple n of the distance between pixels (72) on the spatial light modulator (30). A second image is formed on the spatial light modulator (30), shifted by the shift distance, and directed to the surface (36). Optionally, dithering is provided with an additional shift of an increment of the distance between pixels (72).

17 Claims, 8 Drawing Sheets

PRIOR ART

FIG. 3

PRIOR ART

PRIOR ART

FIG. 4b

PRIOR ART

FIG. 6

COMPENSATING FOR PIXEL DEFECTS BY SPATIAL TRANSLATION OF SCENE CONTENT

CROSS REFERENCE TO RELATED APPLICATIONS

Reference is made to commonly-assigned copending U.S. patent application Ser. No. 09/630,419, filed Aug. 1, 2002, entitled A METHOD AND APPARATUS FOR PRINTING MONOCHROMATIC IMAGING USING A SPATIAL LIGHT MODULATOR by Wong et al. and U.S. patent application Ser. No. 10/055,781, filed Jan. 23, 2002, entitled IMAGING APPARATUS USING DITHER TO MINIMIZE PIXEL EFFECTS by Roddy et al., the disclosures of which are incorporated herein.

FIELD OF THE INVENTION

This invention generally relates to digital printer apparatus that form a two-dimensional image onto a photosensitive medium and more particularly relates to apparatus and methods of compensating for localized pixel anomalies in a spatial light modulator.

BACKGROUND OF THE INVENTION

Originally developed for forming images in display devices, spatial light modulators are increasingly being used in digital printing applications as well. In printing apparatus, spatial light modulators provide significant advantages in cost and performance over earlier digital imaging technologies, both for line printing systems such as the printer depicted in U.S. Pat. No. 5,521,748, and for area printing systems such as the system described in U.S. Pat. No. 5,652,661.

Two-dimensional spatial light modulators, such as those using a digital micromirror device (DMD) from Texas Instruments, Dallas, Tex., or using a liquid crystal device (LCD) can be used to modulate an incoming optical beam for imaging. A spatial light modulator can be considered essentially as a two-dimensional array of light-valve elements, each element corresponding to an image pixel. Each array element is separately addressable and digitally controlled to modulate light by transmitting (or by blocking transmission of) incident light from a light source, typically by affecting the polarization state of the light.

There are two basic types of spatial light modulators in current use. The first type developed was the transmissive spatial light modulator, which, as its name implies, operates by selective transmission of an optical beam through individual array elements. The second type, a later development, is a reflective spatial light modulator. As its name implies, the reflective spatial light modulator, operates by selective reflection of an optical beam through individual array elements. A suitable example of an LCD reflective spatial light modulator relevant to this application utilizes an integrated CMOS backplane, allowing a small footprint and improved uniformity characteristics.

Examples of printing apparatus using digital micromirror devices (DMDs), include that disclosed in U.S. Pat. No. 5,461,411. Photographic printers using the more readily available LCD technology are described in U.S. Pat. Nos. 5,652,661; 5,701,185; and 5,745,156, for example.

Conventionally, LCD spatial light modulators have been developed and employed for digital projection systems for image display, such as is disclosed in U.S. Pat. No. 5,325,137 and in miniaturized image display apparatus suitable for mounting within a helmet or supported by eyeglasses, as is disclosed in U.S. Pat. No. 5,808,800. LCD projector and display designs in use typically employ one or more spatial light modulators, such as using one for each of the primary colors, as is disclosed in U.S. Pat. No. 5,743,610.

It is instructive to note that imaging requirements for projector and display use (as is typified in U.S. Pat. Nos. 5,325,137; 5,808,800; and 5,743,610) differ significantly from imaging requirements for printing by photoprocessing apparatus. Projectors are optimized to provide maximum luminous flux to a screen, with secondary emphasis placed on characteristics important in printing, such as contrast and resolution. Optical systems for projector and display applications are designed for the response of the human eye, which, when viewing a display, is relatively insensitive to image artifacts and aberrations and to image non-uniformity, since the displayed image is continually refreshed and is viewed from a distance. However, when viewing printed output from a high-resolution printing system, the human eye is not nearly as "forgiving" to artifacts and aberrations and to non-uniformity, since irregularities in optical response are more readily visible and objectionable on printed output. For this reason, there can be considerable complexity in optical systems for providing a uniform exposure energy for printing. Even more significant are differences in resolution requirements. Adapted for the human eye, projection and display systems are optimized for viewing at typical resolutions such as 72 dpi or less, for example. Photographic printing apparatus, on the other hand, must achieve much higher resolution, particularly apparatus designed for micrographics applications, which can be expected to provide 8,000 dpi for some systems. Thus, while LCD spatial light modulators can be used in a range of imaging applications from projection and display to high-resolution printing, the requirements on supporting optics can vary significantly.

Another key difference between display and print applications relates to uniform response of pixel elements. Fabrication methods for spatial light modulators are imperfect; as a result, some pixel sites do not perform properly. Thus, for example, an individual pixel may be "stuck" on or off regardless of the control logic signal it receives. Or, an individual pixel may remain in an unwanted half-way state, neither fully on or fully off regardless of the control logic signal applied to it. In display applications, particularly for moving images, individual pixel anomalies may not be readily visible to a viewing audience. However, in print applications, the same type of pixel condition can be readily apparent and can degrade the value of a print, causing "salt and pepper" effects, for example.

In addition to pixel defects described above, dust, dirt, cleaning residues, and other surface irregularities can contribute to non-uniform pixel-to-pixel response of a spatial light modulator, such as waviness and "water-stain" effects. These other effects can be subtler than those resulting from stuck pixels, however, results can be dissatisfying and the perceived value of print results is lowered when such imaging aberrations recur from print to print.

Dithering methods have been developed for improving the relatively low fill factor and increasing the apparent resolution of spatial light modulators in printing applications. Commonly assigned U.S. patent application Ser. Nos. 09/630,419 and 10/055,781, cited above, disclose various dithering approaches for this purpose. Dithering techniques operate by imaging multiple times with the same spatial light modulator in a pattern, making an initial exposure, then shifting the relative position of the spatial light modulator by a predetermined distance for each subsequent exposure, where the distance shifted in each move is less than or equal to one pixel-to-pixel distance. In this way, dithering allows each pixel from the original exposure to fill in the area surrounding it. The image data provided to the spatial light modulator is preferably changed with each shift operation, to effectively provide increased resolution.

Dithering has also been proposed as a method for compensating for pixel site defects. However, experience has shown that dithering does not provide a satisfactory result with all types of pixel defects. Because pixels neighboring a defective pixel tend to overlap the space between pixels in the original exposure, dithering may help to mediate the effect of a pixel that may be stuck in a partially on state. That is, where pixel defects themselves cause only subtle tone shifts, dithering can be helpful. However, in cases where defective pixels have a fixed on or off state, dithering has been found to make imaging defects more noticeable, providing unsatisfactory results in many cases. Thus, in some cases, dithering can actually enhance the damaging effects of a defective pixel, resulting in an unacceptable print.

A spatial light modulator is relatively expensive to fabricate. As with similar types of devices, perfect performance comes at high cost. Low cost means accepting some number of bad pixel sites in the matrix of spatial light modulator pixels has been an economic compromise. It can be appreciated that it would be advantageous for a builder of imaging apparatus to be able to accept lower spatial light modulator quality and to compensate for modulator site defects at some suitable point in the optical system.

Thus can be seen that there is a need for an imaging method that compensates more effectively than conventional methods for pixel site defects in a spatial light modulator.

SUMMARY OF THE INVENTION

According to one aspect of the present invention to provide, an imaging apparatus forms an image on an imaging surface by modulating an area spatial light modulator having a pixel-to-pixel distance. The improved method for compensating for modulator pixel site response defects includes the steps of:

(a) forming a first image with the spatial light modulator at a first position within an image forming plane and directing the first image toward the imaging surface;

(b) translating the spatial light modulator, over a shift distance, to a second position within the image forming plane, the shift distance being a multiple n times the pixel-to-pixel distance, wherein n is an integer greater than or equal to 2;

(c) forming a second image with the spatial light modulator at the second position and directing the second image toward the imaging surface; and wherein the second image is a duplicate of the first image, shifted pixelwise correspondingly by the shift distance, such that the second image overlaps the first image with respect to the imaging surface.

According to another aspect, the present invention provides, in an imaging apparatus that forms an image on an imaging surface by modulating an area spatial light modulator having a resolution based on a pixel-to-pixel distance, an improved method for compensating for modulator pixel site response defects, comprising the steps of:

(a) forming a first image with the spatial light modulator at a first position within an image forming plane and directing the first image toward the imaging surface;

(b) translating the spatial modulator, over a shift distance, to a second position within the image forming plane, the shift distance being greater than twice the pixel-to-pixel distance;

(c) forming a second image with the spatial light modulator at the second position and directing the second image toward the imaging surface; and wherein the second image being different from the first image, thereby increasing image resolution with respect to the imaging surface.

A feature of the present invention is the use of different pixel source locations on the spatial light modulator to provide overlapped or adjacent pixels on the imaging surface.

It is an advantage of the present invention that it lowers the requirements for manufactured quality of a spatial light modulator, thereby decreasing the cost of the imaging apparatus.

It is a further advantage of the present invention that it allows dithering after translation of the spatial light modulator, thereby minimizing the negative effects of defective pixels on the image surface and, at the same time, taking advantage of the benefits of dithering, such as increased pixel fill factor and improved image resolution.

These and other objects, features, and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

DETAILED DESCRIPTION OF THE INVENTION

The present description is directed in particular to elements forming part of, or cooperating more directly with, apparatus in accordance with the invention. It is to be understood that elements not specifically shown or described may take various forms well known to those skilled in the art.

Figure 1A:
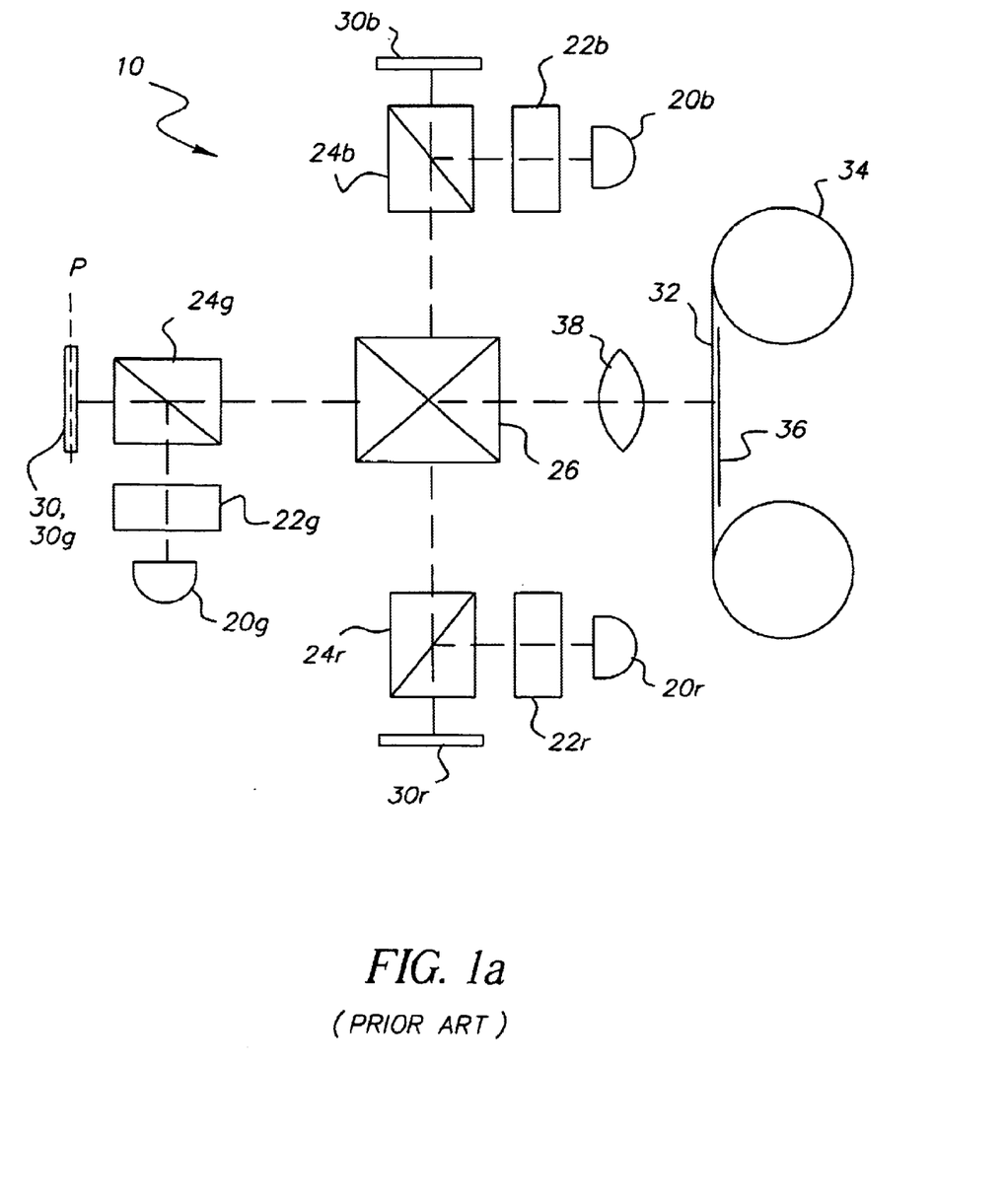
FIGS. 1a and 1b are schematic diagrams showing the components of different embodiments of an imaging apparatus that can be adapted to use the methods of the present invention.

Referring to FIG. 1a, there is shown, in simplified form, the basic arrangement of an exemplary prior art imaging apparatus 10 configured as a color printer. It must be observed that, for the purposes of the present invention, imaging apparatus 10 could be a printer, projector, or other image-forming device, when provided with the necessary support components. For the sake of the present description, it is sufficient merely to note the overall arrangement of the basic components of imaging apparatus 10 in the prior art arrangement of FIG. 1a. There are similar components for modulating each color, represented in FIG. 1a with appended color designators when necessary: r for Red, g for Green, and b for Blue color. For a printer, a photosensitive medium 32, fed from a reel 34 onto the image plane shown as a surface 36 has characteristic cyan, magenta, and yellow response corresponding to the modulated R, G, B colored light. For the red color light modulation path, a light source 20r provides red light. Uniformizing optics 22r perform basic functions that collect light and provide uniform light for modulation. A polarization beamsplitter 24r directs unmodulated light to a spatial light modulator 30r. The uniformized light from light source 20r is modulated by spatial light modulator 30r, passes through polarization beamsplitter 24r, and is combined at dichroic X-cube 26 with modulated light from corresponding components in the green light path (20g, 22g, 24g, 30g) and blue light path (20b, 22b, 24b, 30b). The modulated color image is then directed by a lens 38 for printing or projection display at surface 36. As indicated for the green color channel, each spatial light modulator 30 is positionally located at an imaging plane P with respect to the imaging optics.

It must be observed that the arrangement of FIG. 1a represents a limited number of the possible embodiments for imaging apparatus 10 using the method of the present invention. For example, simpler systems can be built using a single spatial light modulator 30 that is shared or multiplexed between two or three light paths, such as that shown in FIG. 1b. In this configuration, a light source 20 provides an illumination beam of red, green, and blue light in a sequence, by means of a filter wheel 28 driven by a motor 18, as is well known in the imaging art. Other methods for directing, as an illumination beam, one color at a time include using separate LEDs, for example. Uniformizing optics 22 homogenize the illumination beam and provide a uniform field to a polarizing device, such as a polarization beamsplitter 24. Light of suitable polarity for modulation is then directed to a spatial light modulator 30, which modulates the illumination beam with image data that corresponds to the color of the illumination beam provided. For this method, the sequencing of image data corresponds to the sequencing of color in the illumination beam. The modulated color image is then directed by lens 38 for printing or projection display at surface 36. Spatial light modulator 30 is positionally located at an imaging plane P with respect to lens 38 and other imaging optics.

Figure 1B:
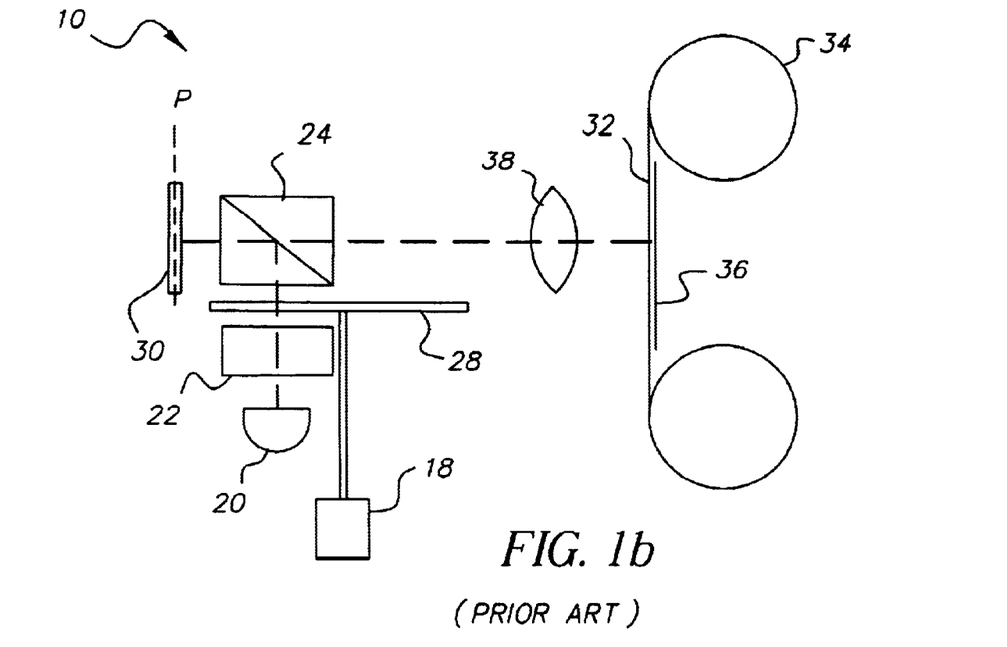

A number of modifications is possible for the configurations of FIGS. 1a and 1b, using techniques well known in the imaging arts. For example, one or more transmissive LCDs could be used instead of the reflective LCDs shown as spatial light modulators 30, 30r, 30g, and 30b.

Figure 2:
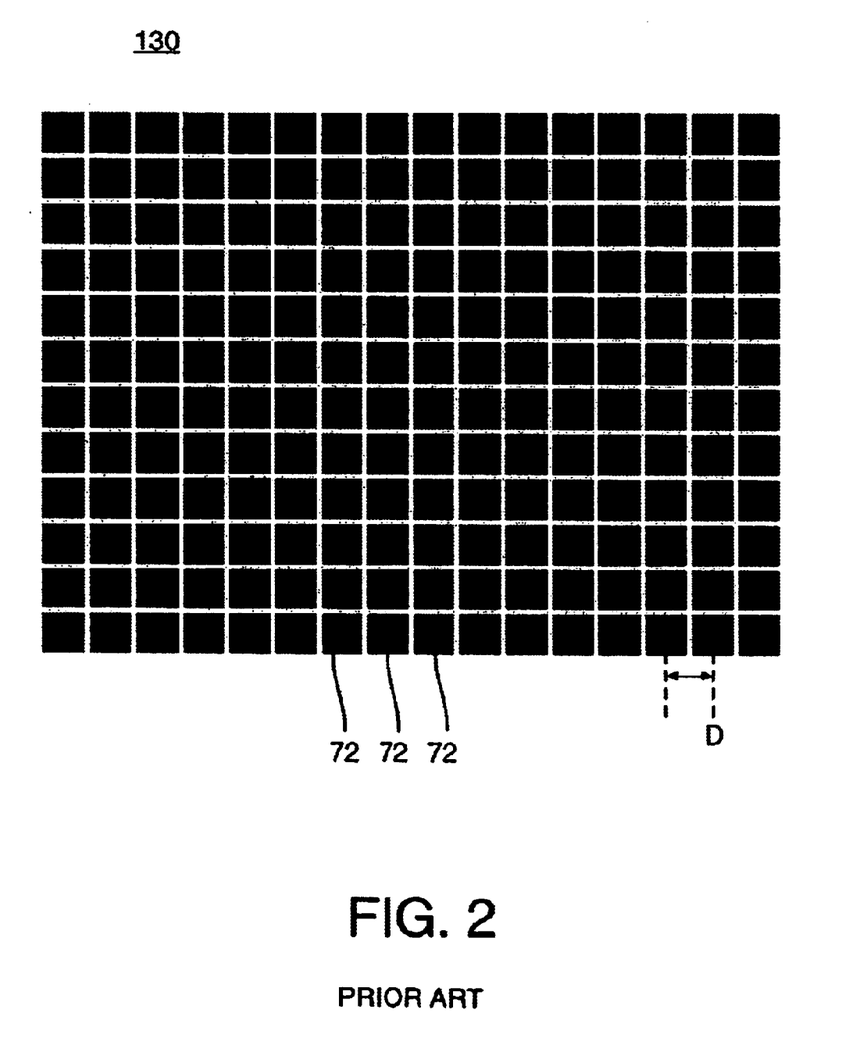
FIG. 2 is a plan view showing a basic pixel arrangement for a representative portion of a spatial light modulator.

Referring to FIG. 2, there is shown the arrangement of an ideal imaged pixel array 130 that would be provided by spatial light modulator 30. Pixel array 130 comprises individual pixels 72 arranged in a two-dimensional matrix having evenly spaced rows and columns as shown. The ideal representation of pixel array 130 in FIG. 2 assumes that there are no defective pixels 72. In such an ideal case, there would be little reason to employ the method of the present invention, however, due to manufacturing imperfections, some small percentage of pixels 72 can be expected to be stuck on, stuck off, or unable to switch properly between states or otherwise respond to image logic control signals. A pixel-to-pixel distance D is a factor of the inherent spatial light modulator resolution, and is measured from the center of one pixel 72 to the center of an adjacent pixel 72.

Figure 3:
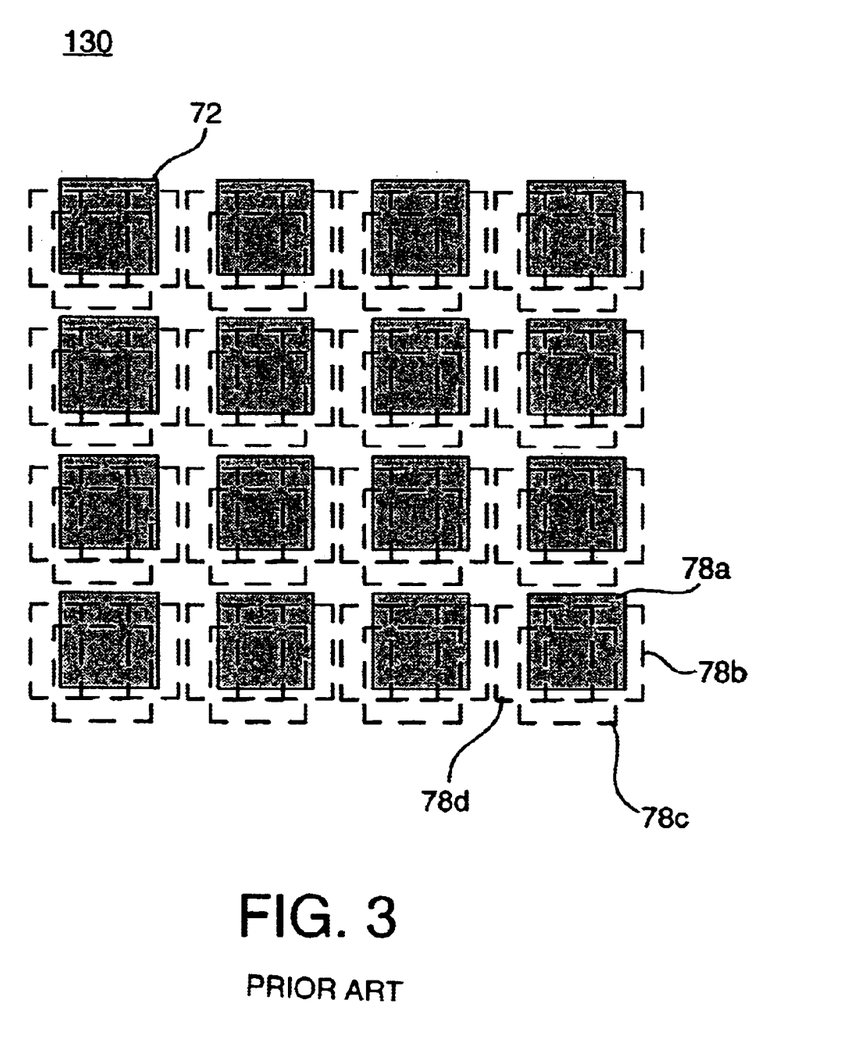
FIG. 3 shows a dithering sequence conventionally used for increasing effective resolution and for improving pixel fill factor.
Figure 4A:
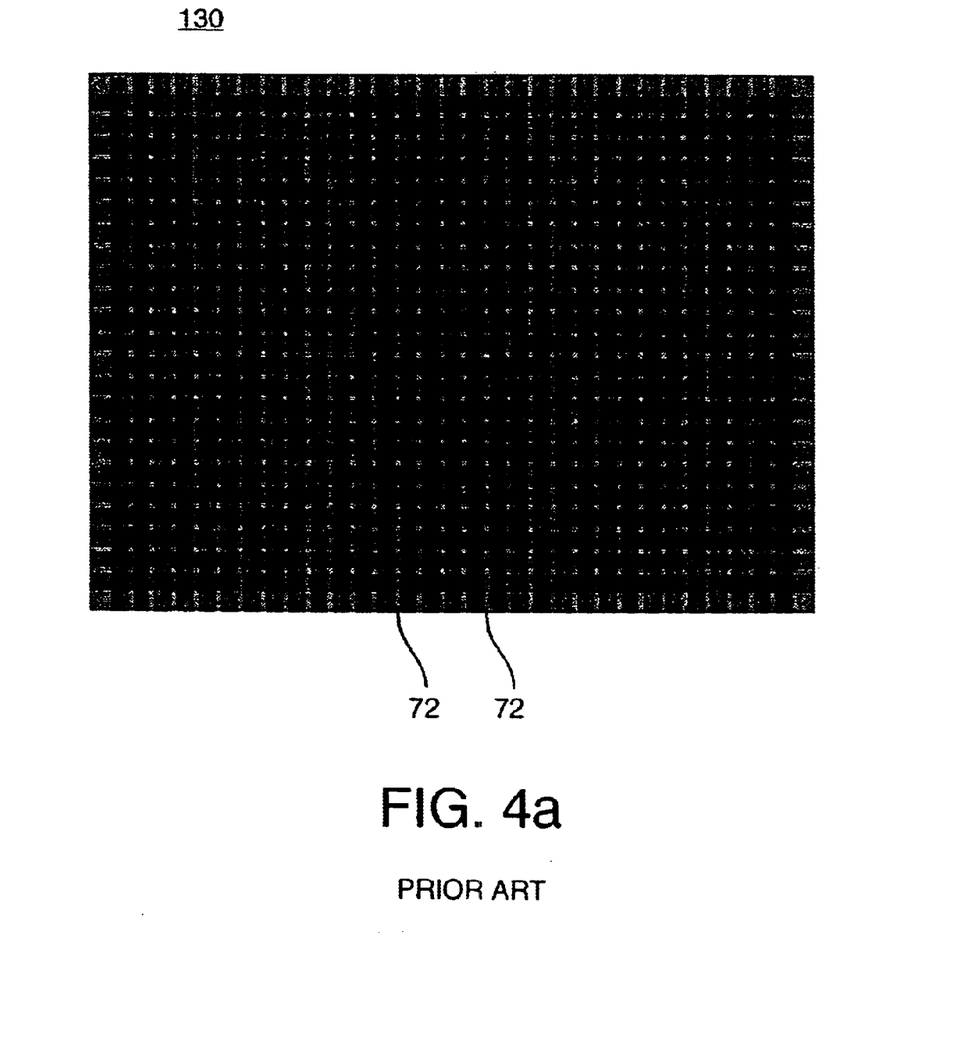
FIG. 4a shows an example image resulting from conventional dithering with no pixel defects.

Referring to FIG. 3, there is shown a conventional dithering pattern that has been proposed for compensating for low fill factor of pixels 72 and has also proposed as one method for compensation for defective pixels 72. Dither movement of spatial light modulator 30 (FIGS. 1a and 1b) or of some other component in the optics path for modulated light effectively shifts pixels 72 from an original imaging position 78a to a second imaging position 78b, then to a third imaging position 78c, and then to a fourth imaging position 78d. Where spatial light modulator 30 has well-behaved pixels 72, this repeated pattern can be effective for improving pixel fill factor, thereby minimizing space between pixels, and for increasing apparent resolution, as is shown in the dithered pixel array 130 representation of FIG. 4a. However, where pixels 72 exhibit some type of defect, the use of a dither pattern can actually tend to degrade the image.

Figure 4B:
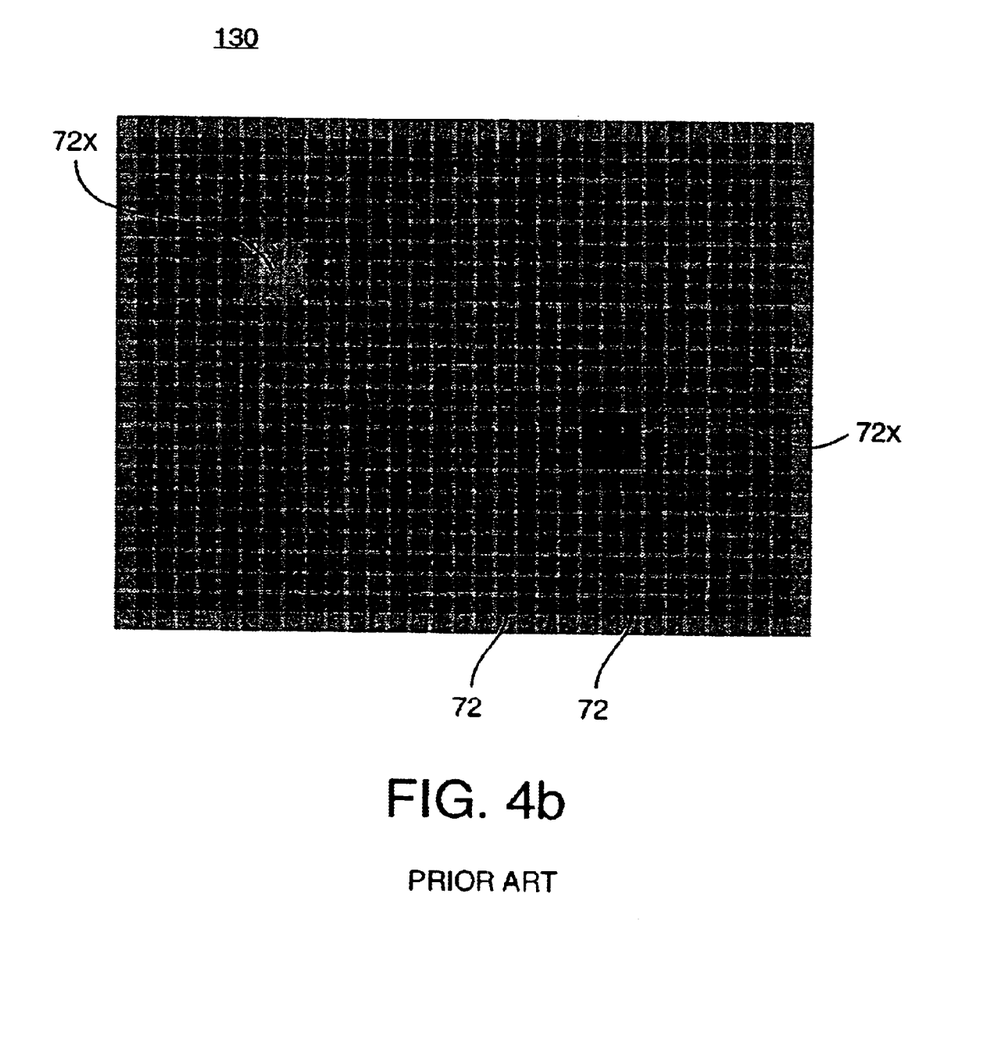
FIG. 4b shows an example image resulting from conventional dithering with two pixel defects.

Referring to FIG. 4b, there is shown an example in which dithering of pixel array 130 enhances the effect of defective pixels 72x. As a worst-case problem, defective pixel 72x can be stuck fully on or fully off. Where this causes a bright dot, use of conventional dithering accentuates the brightness. Similarly, a dark dot would also be enlarged. With reference to FIG. 3, this negative effect increases with the number of imaging positions 78a, 78b, 78c, 78d, and any additional positions where exposure takes place in the dithering sequence. Thus, conventional dithering, such as is shown using the pattern of FIG. 3 for example, can be deleterious where spatial light modulator 30 has defective pixels 72x. Moreover, where two defective pixels 72x are adjacent or separated only by one or two other pixels 72, even more dramatic degradation of the image can result from using conventional dithering. Other dithering methods, such as using a diagonal pattern, because they limit the area of surface 36 that is affected by defective pixel 72x, may reduce the impact of defective pixels 72x, but with limited success.

Figure 5A:
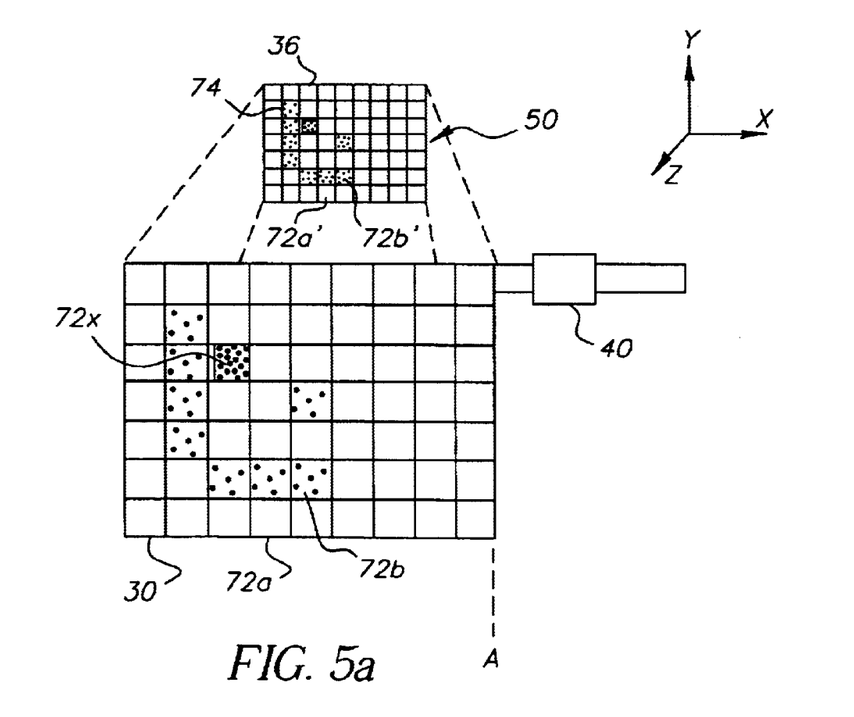
FIGS. 5a and 5b show, from the perspective of the imaging optics, image translation according to the present invention.
Figure 5B:
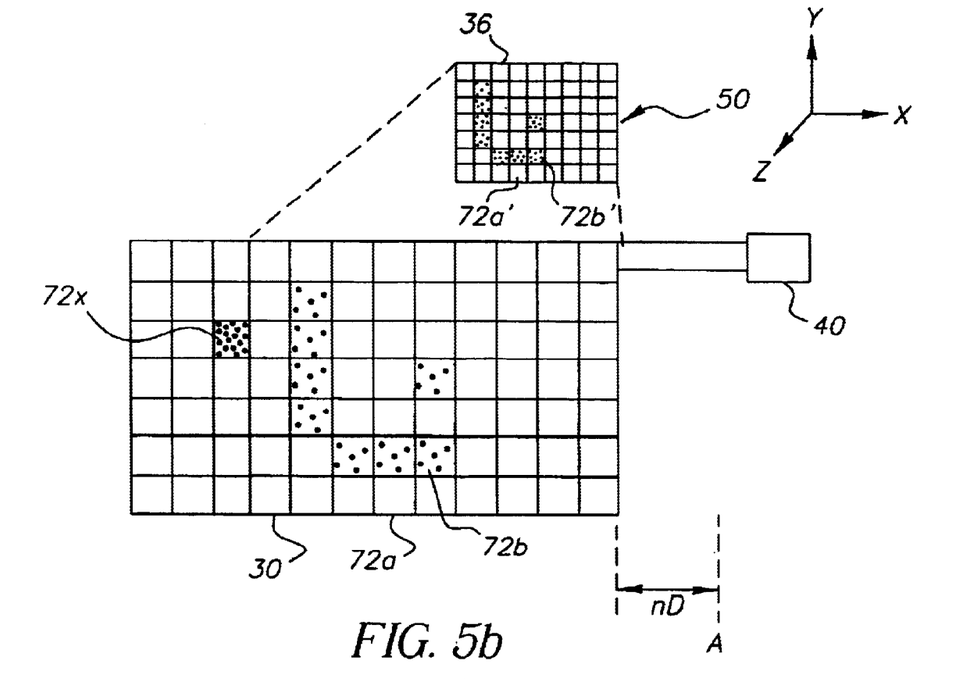
Figure 5C:
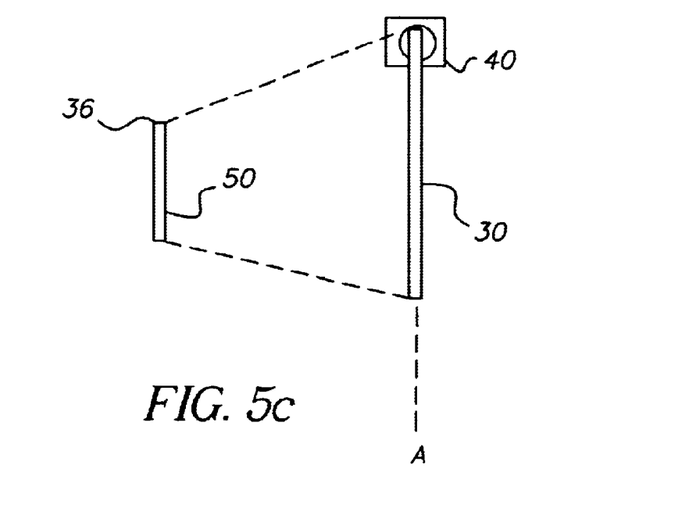
FIG. 5c shows a side view corresponding to the views of FIGS. 5a and 5b.

As noted in the background material given above and shown with respect to FIG. 3, dithering methods characteristically move spatial light modulator 30 in small increments of pixel-to-pixel distance and can yield unsatisfying results when one or more pixel sites are defective. Unlike conventional dithering, the method of the present invention translates the image by an integral multiple of pixel-to-pixel distance, effectively "shifting the problem" so that a single defective pixel 72x may be used in multiple exposures, but occupies a different position with respect to imaging surface 36 with each exposure, thereby affecting different portions of the final image. Referring to FIGS. 5a and 5b, there is shown, from a perspective view, how the method of the present invention operates. In FIGS. 5a, an actuator 40 is positioned at an edge of spatial light modulator 30. Light modulated by spatial light modulator 30 is directed by system optics (as were shown in FIGS. 1a and 1b but are omitted from FIG. 3 for clarity) toward surface 36 for forming an image 50 thereon. Spatial light modulator 30 provides a pattern of on pixels 72a and off pixels 72b that form image 50. Defective pixel 72x, however, provides an unintended result on a defective imaged pixel 74 during exposure at this first position, where spatial light modulator 30 is aligned at location A.

Referring to FIG. 5b, there is shown how translation of the image occurs and helps to distinguish translation from dithering. Actuator 40 shifts spatial light modulator 30 in a preferred direction by a distance nD that is an integral multiple (n) of the pixel-to-pixel distance. In so doing, the relative position of defective pixel 72x with respect to image 50 on surface 36 is also shifted. The image formed on spatial light modulator is then translated by (n) pixels so that different on and off pixels 72a and 72b are imaged to corresponding pixel locations on image 50. As a result, the negative impact of defective pixel 72x on image 50 is minimized. Thus, unlike the case with conventional dithering, wherein the damage done to the image increases with each exposure position in which defective pixel 72x is used, the present invention provides a method wherein the damage done by defective pixel 72x decreases with each exposure position used. With pixel translation, as illustrated in the sequence of FIGS. 5a and 5b, it is to be emphasized that (1) the same image data is used to form the image on spatial light modulator 30 at each position of spatial light modulator 30 and (2) the image itself is shifted by an integral multiple of the pixel-to-pixel distance. This translation behavior is in contrast to conventional dithering, in which (1) different image data is used at each position of spatial light modulator 30, to enhance resolution and prevent blurring of the image; and (2) relative pixel positions are shifted by a fraction of the pixel-to-pixel distance.

It must be noted that the representation of spatial light modulator 30 in the schematic of FIGS. 5a and 5b is for illustration only, to show the relative position of pixel 72a, 72b positions on spatial light modulator 30 and pixel 72a', 72b' positions on image 50, without the complexity of representing the intermediate optical components. For a transmissive LCD as spatial light modulator 30, for example, the light source (light sources 20, 20r, 20g, or 20b in FIGS. 1a and 1b) would direct light through spatial light modulator 30 to form image 50. Conversely, for a reflective LCD or DMD as spatial light modulator 30, the light source would reflect light from the surface of spatial light modulator 30, so that the pixel locations shown would be facing image 50, not visible from the rear view represented in FIGS. 5a and 5b.

As a further option, the present invention provides additional improvement by combining the following:
(1) translation of the image, or shifting movement of the image by nD, that is, by an integral multiple (n) of the pixel-to-pixel distance (D); with
(2) dithering, or re-positioning of the image pixels 72 by an added fractional increment fD, that is, by a fractional portion (f) of the pixel-to-pixel distance (D), along with modified image data for one or more pixels 72.

Thus, for example, a 3.5×3.5 dither pattern could be used, whereby spatial light modulator 30 is first translated three full pixels in a direction, then dithered 0.5 pixels in that same direction, with the corresponding change in image data. With such movement, the image that is provided at this position both provides the benefits of dithering and minimizes pixel 72 imaging defects. Further movement by 3.5 pixels in a second orthogonal direction, followed by imaging, followed by movement in additional directions with imaging, yields a result that has both the benefits of dithering, such as enhanced resolution and improved pixel fill factor, and the benefits of pixel translation, which dramatically reduces the negative impact of defective pixels 72x. Moreover, negative effects of dithering, for pixels stuck fully on or fully off, are dramatically reduced.

Figure 6:
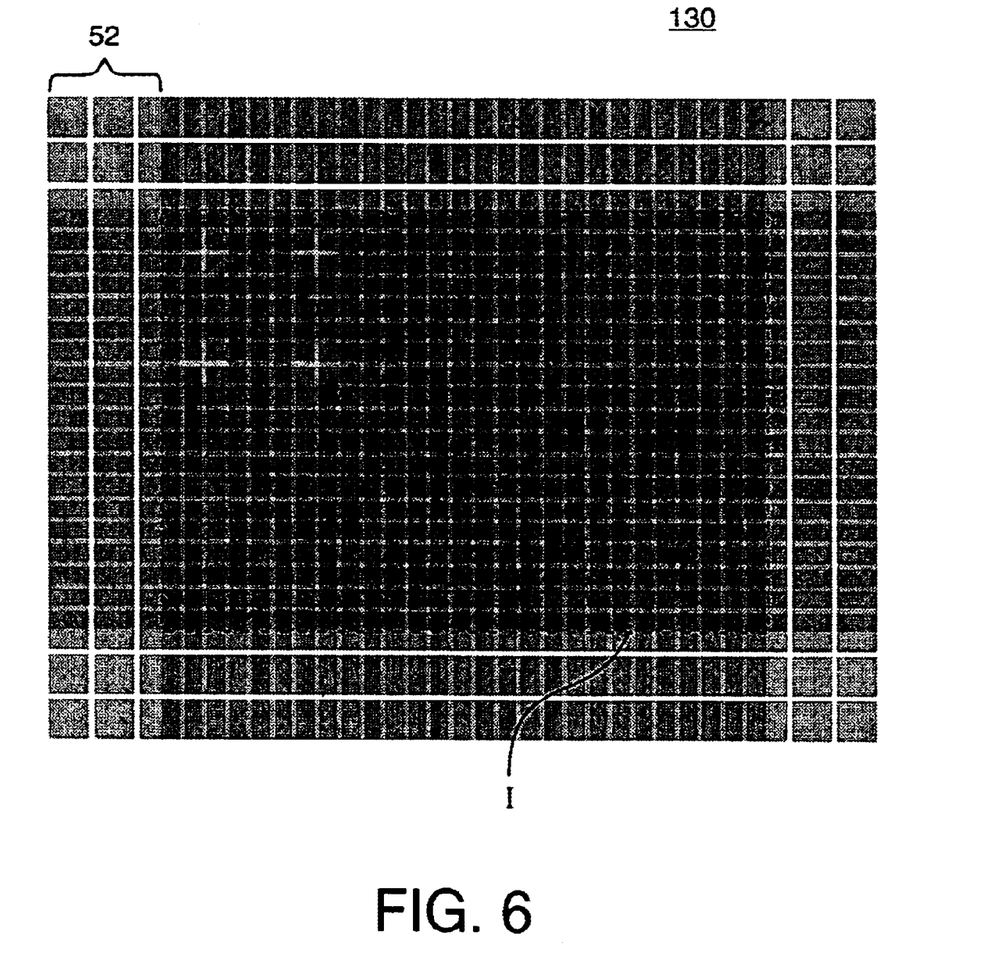
FIG. 6 shows a plane view of pixel imaging using the method of the present invention, with two pixel defects.

The relative benefits of the method of the present invention can be most clearly seen by comparing the example of FIG. 4b with the example of FIG. 6. Both examples begin with two defective pixels 72x on spatial light modulator 30. Resulting pixel array 130 in FIG. 4b shows the impact of conventional dithering techniques. In contrast, pixel array 130 in FIG. 6 shows what happens when translation and dithering are combined. Unlike the image shown in FIG. 4b, in which the location of each defective pixel 72x can be clearly identified, the image shown in FIG. 6 has only a hint of defective pixel 72x location.

It must be noted that the translation technique of the present invention results in a slightly reduced image area I, as is shown in FIG. 6. A bordering area 52 surrounds image area I and would be masked, such as using an aperture in the imaging optical system, for example. The actual bordering area 52 that is unused depends on the translation distance and is typically on the order of a few pixels along each edge of image area I.

When used for full-color imaging, spatial light modulator 30 may be shared for successively imaging with light at a first wavelength, then at a second wavelength, and possibly at a third and additional wavelengths, as is noted hereinabove in the description for FIGS. 1a and 1b. In typical full-color printing applications, for example, separate exposures are provided for red, green, and blue color planes. In such a case, it may be advantages to translate spatial light modulator 30 over a different distance for each color plane. For example, when imaging the red color plane, spatial light modulator 30 is moved a translation distance of six pixels. When imaging the green color plane, spatial light modulator 30 is moved a translation distance of four pixels. When imaging the blue color plane, spatial light modulator 30 is moved a translation distance of three pixels. With such a pattern, the impact of defective pixels 72x would be minimized, with imaging defects distributed differently over each color plane. Dithering could also be provided to supplement this translation step for added resolution and improved fill factor.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention. For example, while the preferred embodiment uses an LCD, apparatus using other types of area spatial light modulator, such as a DMD, could alternately employ the same method. Spatial light modulator 30 can be shifted in any suitable direction within the imaging plane. Actuator 40 can be any of a number of types of actuator, such as a piezoelectric or electromagnetic actuator, for example, and would typically cooperate with a component providing some type of opposing force, as is well known in the mechanical arts.

Thus, what is provided is a method for compensating for defective pixel conditions in an imaging apparatus.

PARTS LIST

10 Imaging apparatus
18 Motor
20 Light source
20r Red light source
20g Green light source
20b Blue light source
22 Uniformizing optics
22r Red uniformizing optics
22g Green uniformizing optics
22b Blue uniformizing optics 24 Polarization beamsplitter
24r Red polarization beamsplitter
24g Green polarization beamsplitter
24b Blue polarization beamsplitter
30 Spatial light modulator
30r Red spatial light modulator
30g Green spatial light modulator
30b Blue spatial light modulator
26 X-cube
28 Filter wheel
32 Photosensitive medium
34 Reel
36 Surface
38 Lens
40 Actuator
50 Image
52 Bordering area
72 Pixel
72a On pixel
72b Off pixel
72a' On pixel
72b' Off pixel
72x Defective pixel
74 Defective imaged pixel
78a Original imaging position
78b Second imaging position
78c Third imaging position
78d Fourth imaging position
130 Pixel array

What is claimed is:

1. In an imaging apparatus that forms an image on an imaging surface by modulating an area spatial light modulator having a pixel-to-pixel distance, an improved method for compensating for modulator pixel site response defects, comprises the steps of:
   (a) forming a first image with the spatial light modulator at a first position within an image forming plane and directing said first image toward the imaging surface;
   (b) translating the spatial light modulator, over a shift distance, to a second position within said image-forming plane, said shift distance being a multiple n times said pixel-to-pixel distance, wherein n is an integer greater than or equal to 2;
   (c) forming a second image with the spatial light modulator at said second position and directing said second image toward said imaging surface; and
   wherein said second image is a duplicate of said first image, shifted pixelwise correspondingly by said shift distance, such that said second image overlaps said first image with respect to the imaging surface.

2. A method for compensating for modulator pixel site response defects according to claim 1 wherein the step of forming a first image comprises the step of modulating an LCD spatial light modulator.

3. A method for compensating for modulator pixel site response defects according to claim 1 wherein the step of forming a first image comprises the step of modulating a DMD spatial light modulator.

4. A method for compensating for modulator pixel site response defects according to claim 1 wherein the step of translating the spatial light modulator over a shift distance comprises the step of driving a piezoelectric actuator.

5. A method for compensating for modulator pixel site response defects according to claim 1 wherein the step of translating the spatial light modulator over a shift distance comprises the step of driving an electromagnetic actuator.

6. A method for compensating for modulator pixel site response defects according to claim 1 wherein the steps of forming said first image at said first position, translating the spatial light modulator to said second position, and forming said second image at said second position are repeated for a first color, a second color, and additional colors.

7. A method for compensating for modulator pixel site response defects according to claim 6 wherein said integer n for said first color does not equal said integer n for said second color, so that said shift distance for said first color differs from said shift distance for said second color.

8. In an imaging apparatus that forms, from a predetermined sequence of colors comprising at least a first color and a second color, a multicolor image on an imaging surface by modulating a source illumination beam at an area spatial light modulator having a predetermined pixel-to-pixel distance, an improved method for compensating for modulator pixel site response defects, with the repeated steps performed for each separate color in the predetermined sequence of colors, of:
   (a) providing the source illumination beam for said separate color;
   (b) modulating said source illumination beam to form a first image with the spatial light modulator at a first position within an image forming plane and directing said first image toward the imaging surface;
   (c) translating the spatial light modulator, over a shift distance, to a second position within said image-forming plane, said shift distance being a multiple n times said predetermined pixel-to-pixel distance, wherein n is an integer greater than or equal to 2;
   (d) modulating said source illumination beam to form a second image with the spatial light modulator at said second position and directing said second image toward said imaging surface; and
   wherein said second image is a duplicate of said first image, shifted pixelwise correspondingly by said first shift distance, such that said second image overlaps said first image with respect to the imaging surface.

9. A method for compensating for modulator pixel site response defects according to claim 8 wherein the step of modulating said source illumination beam comprises the step of modulating an LCD spatial light modulator.

10. A method for compensating for modulator pixel site response defects according to claim 8 wherein the step of modulating said source illumination beam comprises the step of modulating a DMD spatial light modulator.

11. A method for compensating for modulator pixel site response defects according to claim 8 wherein the step of translating the spatial light modulator over a shift distance comprises the step of driving a piezoelectric actuator.

12. A method for compensating for modulator pixel site response defects according to claim 8 wherein the step of translating the spatial light modulator over a shift distance comprises the step of driving an electromagnetic actuator.

13. A method for compensating for modulator pixel site response defects according to claim 8 wherein said integer n for said first color does not equal said integer n for said second color, so that said shift distance for said first color does not equal said shift distance for said second color.

14. In an imaging apparatus that forms an image on an imaging surface by modulating an area spatial light modulator having a resolution based on a pixel-to-pixel distance, an improved method for compensating for modulator pixel site response defects, with the steps of:
   (a) forming a first image with the spatial light modulator at a first position within an image forming plane and directing said first image toward the imaging surface;

(b) translating the spatial modulator, over a shift distance, to a second position within said image-forming plane, said shift distance being greater than twice said pixel-to-pixel distance;

(c) forming a second image with the spatial light modulator at said second position and directing said second image toward said imaging surface; and wherein said second image is different from said first image, thereby increasing image resolution with respect to the imaging surface.

15. In an imaging apparatus that forms an image on an imaging surface by modulating an area spatial light modulator having a pixel-to-pixel distance, an improved method for compensating for modulator pixel site response defects, with the steps of:

(a) forming a first image with the spatial light modulator at a first position within an image forming plane and directing said first image toward the imaging surface;

(b) translating the spatial light modulator, over a shift distance, to a second position within said image-forming plane, said shift distance being a multiple n times said pixel-to-pixel distance, wherein n is an integer greater than or equal to 2, plus a fractional distance f, wherein f is a fraction of said pixel-to-pixel distance;

(c) forming a second image with the spatial light modulator at said second position and directing said second image toward said imaging surface; and wherein said second image is different from said first image.

16. A method for compensating for modulator pixel site response defects according to claim 15 wherein the steps of forming said first image at said first position, translating the spatial light modulator to said second position, and forming said second image at said second position are repeated for a first color, a second color, and additional colors.

17. A method for compensating for modulator pixel site response defects according to claim 16 wherein said integer n for said first color does not equal said integer n for said second color, so that said shift distance for said first color differs from said shift distance for said second color.

* * * * *